Figures 1, 2:
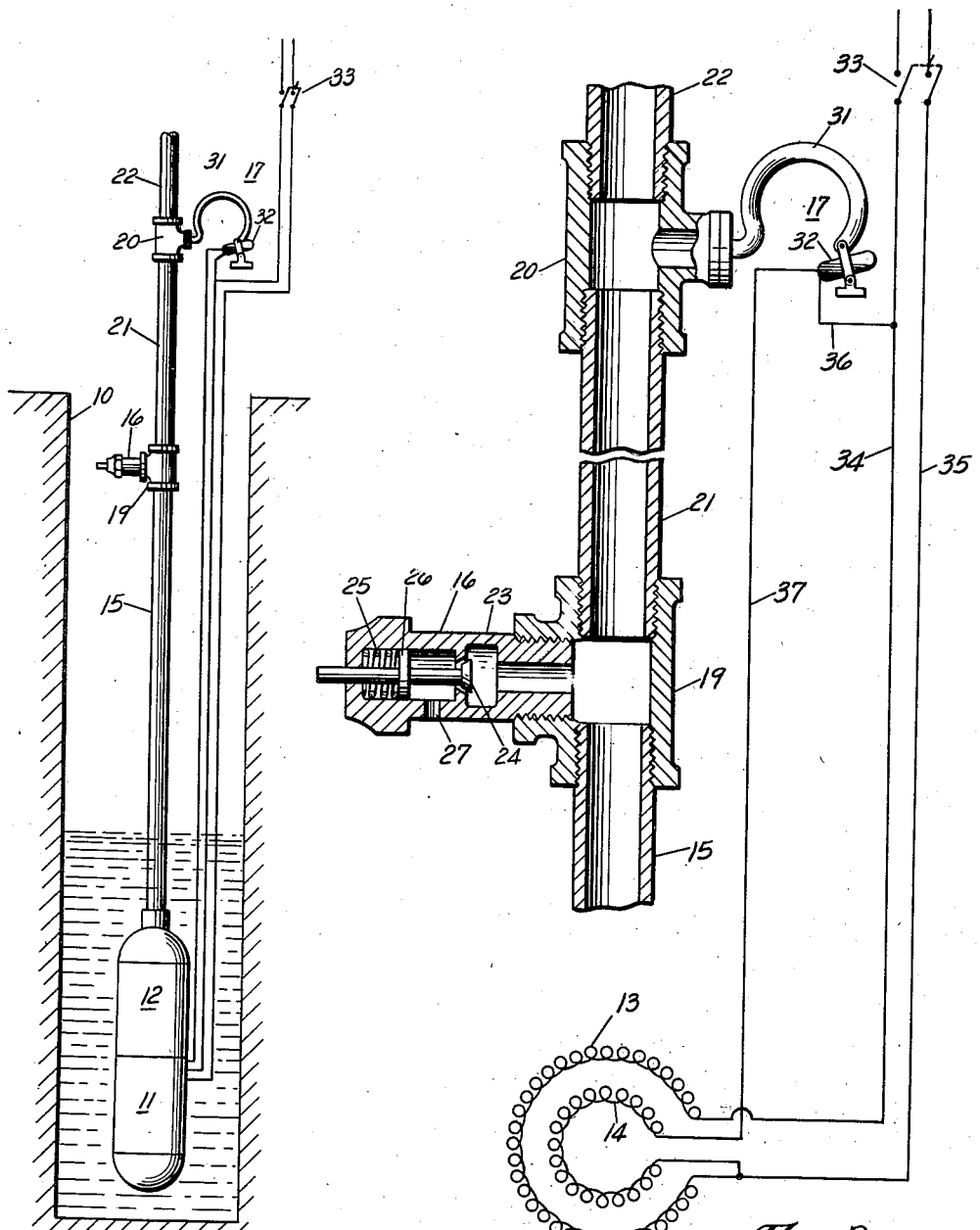

Aug. 17, 1943.  F. J. SIGMUND ET AL  2,326,804
CONTROL MECHANISM
Filed Nov. 15, 1941

INVENTORS
Frank J. Sigmund
William S. Hlavin
BY
Hoodling and Krost, attys.

Patented Aug. 17, 1943

2,326,804

UNITED STATES PATENT OFFICE 2,326,804

CONTROL MECHANISM

Frank J. Sigmund and William S. Hlavin, Cleveland, Ohio

Application November 15, 1941, Serial No. 419,334

5 Claims. (Cl. 103—11)

Our invention relates in general to control mechanism and more particularly to control mechanisms adapted to govern the energization of the split phase starting winding of a single phase induction motor.

Our control mechanism is particularly adaptable to govern the energization of the split phase starting winding of a single phase induction motor utilized to drive a pump having a fluid discharge conduit extending upwardly from the pump. An illustration of a typical installation would be where the motor and pump are submersed in a well and where the energization of the split phase starting winding for the single phase induction motor is governed by the condition of the fluid being pumped in the fluid conduit extending upwardly in the well.

An object of our invention is the provision of a control mechanism governed by the condition of the fluid being pumped to control the split phase starting winding of the single phase induction motor employed to drive the pump submersed in the well.

Another object of our invention is the provision of a control mechanism having a control switch responsive to the pressure of the fluid being pumped in the conduit leading upwardly from the pump.

Another object of our invention is the provision of a control mechanism which functions to energize the split phase starting winding of a single phase induction motor utilized to drive a pump submersed in fluid, wherein the split phase starting winding is energized during the time the fluid being pumped in rising a predetermined distance in the fluid conduit extending upwardly from the pump.

Another object of our invention is the provision of energizing the split phase starting winding of a single phase induction motor during the interval of time that it takes the fluid to rise a predetermined distance in the fluid conduit extending upwardly from a fluid pump.

Other objects and a fuller understanding of our invention may be had by referring to the following description and claim taken in conjunction with the accompanying drawing, in which:

Figure 1 illustrates a control mechanism embodying the features of our invention and shown in relation to a motor and pump submersed in a well; and Figure 2 is an enlarged cross-sectional view of the upper portion of the fluid conduit shown in Figure 1 and illustrating in addition diagrammatically the electrical connection for energizing the windings of the motor employed to drive the fluid pump submersed in the well.

With reference to the drawing, the reference character 10 represents generally a well or other arrangement in which a motor pumping unit may be submersed. The well may be several hundred feet deep or may be relatively shallow depending upon the condition of the installation. The motor pumping unit may be of any suitable design and in the drawing the motor is illustrated generally by the reference character 11 and the pump is illustrated generally by the reference character 12. The motor is of the single phase induction type and comprises a main winding 13 and a starting winding 14 such, for example, as shown in Figure 2 of the drawing. In starting the motor, the main winding 13 and the starting winding 14 are both energized until the motor acquires a certain running or operating condition, after which the starting winding 14 is deenergized. The starting winding 14 is in space quadrature with the main winding and is referred to as a split phase starting winding for a single phase induction motor.

Extending upwardly from the pump 12 is a fluid conduit 15 for delivering the fluid being pumped. The fluid conduit 15 terminates in a T-shaped flange coupling 19 having a drain check valve 16 threadably fitting therein. Extending upwardly from the T-shaped flange coupling 19 is a drain pipe 21 which terminates in a T-shaped flange 20 having a pressure responsive switch 17 associated therewith. Extending upwardly from the T-shaped flange 20 is an outlet discharge pipe 22 which delivers the fluid being pumped to its destination. The fluid pipe 15, the drain pipe 21, and the outlet discharge pipe 22 constitute one continuous fluid conduit for delivering the fluid being pumped from the pump 12 to the point of its destination.

The drain check valve 16 comprises a body 23 having mounted therein a pressure responsive valve 24 and a spring 25. As illustrated, the spring 25 biases the valve 24 to its open position. Connected to the valve stem is a piston 26 that slidably fits within a longitudinal bore of the body 23 of the drain check valve 16. When the pressure of the fluid being pumped attains a predetermined condition the valve 24 is biased or urged to its closed position by the action of the fluid pressure acting against the piston 26. For pressures below the predetermined value, the spring 25 biases the valve 24 to its open position. A drain opening 27 is provided in the body of the drain check valve 16 and provides for draining the fluid from the pipes 21 and 22 after the pumping operations have ceased. Accordingly, the operation of the drain check valve 16 is such that during the pumping operation the fluid pressure acting upon the piston 26 closes the valve 24 with the result that no fluid is drained through the drain opening 27. But just as soon as the pumping operation is discontinued, and the pressure in the fluid conduit has decreased to a value below a certain predetermined value, then the spring 25 operates to open the valve 24 at which time the fluid in the pipes 21 and 22 begins to drain through the drain opening 27.

The pressure responsive switch 17 may be of any suitable design and, as illustrated, comprises a flexible hollow tube 31 adapted to actuate a mercury switch 32 for governing the energization of the starting winding 14.

The mercury switch 32 is arranged to provide a closed circuit so long as the pressure of the fluid is insufficient to force the free or right-hand end of the flexible tube 31 outwardly and tilt the mercury switch to its open position. In other words, the mercury switch 32 is in its closed condition when the fluid is drained down through the drain check valve 16.

When explaining the operation of our invention, let it be assumed that the starting switch 33 is closed upon which instance the main winding 13 of the single phase induction motor is energized directly through the main conductors 34 and 35. The split phase starting winding 14 is instantly energized through a conductor 36, the mercury switch 32 and a conductor 37. With both windings energized, the motor accelerates to its normal running speed. During the time that the motor is accelerating and obtaining its normal running speed, the pump 12 is pumping liquid up through the fluid conduit 15 and causing the water or fluid being pumped to rise in the drain pipe 21 and the outlet discharge pipe 22 to the point of destination. The starting winding 14 continues to be energized until the pressure of the fluid acting within the flexible tube 31 attains a predetermined value sufficient to tilt the mercury switch 32 to its open position, at which time the starting winding 14 is deenergized. The motor continues to run under the energization of the main winding 13. The interval that the starting winding 14 remains energized for starting purposes is dependent upon the conditions of operation. The interval may be varied by varying the length of the drain pipe 21, as well as its diameter. In other words, the longer or the larger the drain pipe 21 the more time is taken for the liquid or fluid to rise to operate the mercury switch 32. In any given installation, the length and size of the drain pipe 21 may be varied to most suitably accommodate the starting characteristic of the single phase induction motor. The mercury switch 32 continues to remain open so long as the motor 11 is operating the pump 12 for pumping fluid out through the outlet discharge pipe 22. During the pumping operation, the valve 24 in the drain check valve 16 is biased to its closed position by the fluid being pumped acting upon the piston 26. Just as soon as the motor and pumping operation cease, the spring 25 biases the valve 24 to the right in its open position after which the fluid above the drain check valve 26 begins to drain out through the drain opening 27. The draining of the fluid causes the flexible tube 31 to actuate the mercury switch 32 to its closed position so that it is in readiness for restarting of the motor for another period of operation.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. The combination with a fluid pump having a fluid conduit extending upwardly therefrom, a single phase induction motor having a split phase starting winding for driving the pump, of control means for governing the split phase starting winding, said control means comprising, in combination, an electrical switch responsive to the pressure of the fluid being pumped in the conduit at an elevated position above the pump, circuit connections through the switch for governing the energization of the split phase starting winding, and drain means having an opening in the fluid conduit below the pressure responsive switch to drain the fluid in the conduit to a point below the pressure responsive switch.

2. The combination with a fluid pump having a fluid conduit extending upwardly therefrom, a single phase induction motor having a split phase starting winding for driving the pump, of control means for governing the split phase starting winding, said control means comprising, in combination, an electrical switch responsive to the pressure of the fluid being pumped in the conduit at an elevated position above the pump, circuit connections through the switch for governing the energization of the split phase starting winding, and drain means having an opening in the fluid conduit below the pressure responsive switch to drain the fluid in the conduit to a point below the pressure responsive switch, said switch remaining closed to energize the split phase starting winding during the time the fluid being pumped is rising in the conduit from the drain means to the pressure responsive switch.

3. The combination with a fluid pump having a fluid conduit extending upwardly therefrom, a single phase induction motor for driving the pump, said motor having a main winding and a split phase starting winding, and a main electrical switch for governing the energization of the main winding, of control means for governing the energization of the split phase starting winding, said control means comprising, in combination, an auxiliary electrical switch responsive to the pressure of the fluid being pumped in the conduit at an elevated position above the pump, circuit connections through the pressure responsive switch for governing the energization of the split phase starting winding, and drain means having a small opening in the fluid conduit below the pressure responsive switch to drain the fluid in the conduit to a point below the pressure responsive switch, said pressure responsive switch remaining closed to energize the split phase starting winding during the time the fluid being pumped is rising in the conduit from the drain means to the pressure responsive switch.

4. The combination with a fluid pump having a fluid conduit extending upwardly therefrom, a single phase induction motor for driving the pump, said motor having a main winding and a split phase starting winding, and a main electrical switch for governing the energization of the main winding, of control means for governing the energization of the split phase starting winding, said control means comprising, in combination, an auxiliary electrical switch responsive to the pressure of the fluid being pumped in the conduit at an elevated position above the pump, circuit connections through the pressure responsive switch for governing the energization of the split phase starting winding, and drain means having a small opening in the fluid conduit below the pressure responsive switch to drain the fluid in the conduit to a point below the pressure responsive switch, said pressure responsive switch remaining closed to energize the split phase starting winding during the time the fluid being pumped is rising in the conduit from the drain means to the pressure responsive switch, said drain means including a pressure responsive valve and a spring, said spring biasing the valve to open position and the pressure of the fluid urging the valve to closed position.

5. The combination with a fluid pump having a fluid conduit extending upwardly therefrom, a single phase induction motor for driving the pump, said motor having a main winding and a split phase starting winding, and a main electrical switch for governing the energization of the main winding, of control means for governing the energization of the split phase starting winding, said control means comprising, in combination, an auxiliary electrical switch responsive to the pressure of the fluid being pumped in the conduit at an elevated position above the pump, circuit connections through the pressure responsive switch for governing the energization of the split phase starting winding, and drain means having a small opening in the fluid conduit below the pressure responsive switch to drain the fluid in the conduit to a point below the pressure responsive switch, said pressure responsive switch remaining closed to energize the split phase starting winding during the time the fluid being pumped is rising in the conduit from the drain means to the pressure responsive switch, said drain means including a pressure responsive valve and a spring, said spring biasing the valve to open position and the pressure of the fluid urging the valve to closed position, said pressure responsive switch including a bendable hollow tube and a mercury switch actuated thereby, said bendable hollow tube being in communication with the fluid conduit.

FRANK J. SIGMUND.
WILLIAM S. HLAVIN.